United States Patent Office 3,006,945
Patented Oct. 31, 1961

3,006,945
PREPARATION OF ORGANIC COMPOUNDS
Lloyd E. Goddard, Detroit, and Joseph D. Odenwelier, Birmingham, Mich., assignors to Ethyl Corporation, New York, N.Y., a corporation of Delaware
No Drawing. Filed Sept. 1, 1960, Ser. No. 53,385
11 Claims. (Cl. 260—461)

This invention relates to a novel and useful process for the preparation of certain dialkyl(3,5-dialkyl-4-hydroxybenzyl)phosphonates.

The dialkyl(3,5-dialkyl-4-hydroxybenzyl)phosphonates with which this invention deals are extremely useful antioxidants. They have been found to be superior antioxidants for use in lubricating and other industrial oils, petroleum wax, rubber and rubber-like materials, and a wide range of other organic media.

An object of this invention is to provide a novel chemical process for preparing the above phosphonates. A further object is to provide a process which comprises reacting certain 3,5-dialkyl-4-hydroxybenzyl chlorides with certain trialkyl phosphites. Other important objects of this invention will be apparent from the ensuing description.

The above and other objects of this invention are accomplished by providing a process which comprises reacting a compound having the formula:

I
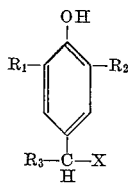

wherein $R_1$ is an alkyl radical having from 1 to 12 carbon atoms, $R_2$ is an alkyl radical having from 3 to 12 carbon atoms, $R_3$ is selected from the group consisting of hydrogen, alkyl radicals having from 1 to 12 carbon atoms and mononuclear aryl radicals having from 6 to 12 carbon atoms, and X is a halogen, with a trialkyl phosphite wherein the alkyl radicals each have from 1 to 12 carbon atoms. The preferred halogen is chlorine but compounds containing other halogens of atomic weight greater than 17 may be used. Chlorine is preferred because of definite cost advantages and its high reactivity.

The preparation of certain preferred reactants of Formula I is disclosed in an application filed concurrently with the present application entitled "Organic Aromatic Compounds," the inventor being Joseph D. Odenweller. They can be prepared by reacting a suitable 2,6-dialkylphenol with an aldehyde having from 1 to 13 carbon atoms, and an excess of concentrated hydrogen halide. Thus, 3,5-di-tert-butyl-4-hydroxybenzyl chloride can be prepared by reacting a 2,6-di-tert-butylphenol with formaldehyde and hydrochloric acid.

One way of preparing the trialkyl phosphite starting materials is the reaction of a suitable alcohol with phosphorus trichloride in the presence of pyridine. For example, tri-n-dodecyl phosphite may be prepared by the reaction of n-dodecanol with phosphorus trichloride in the presence of pyridine. In a similar manner, isopropyl alcohol can react with phosphorus trichloride in the presence of pyridine to produce triisopropyl phosphite. Also, sec-butyl alcohol can react with phosphorus trichloride, in pyridine, to produce tri-sec-butyl phosphite.

The trialkyl phosphite and the benzyl chloride are preferably present in substantially equimolar quantities. The phosphite may also be present in molar excess, up to 10 times the molar concentration of the benzyl chloride. The reaction will proceed when benzyl chloride is present in molar excess but upon distilling the product, decomposition of the benzyl chloride makes it undesirable to have it in substantial excess. There is no special order in which the reactants need be mixed. The reaction will proceed equally well when benzyl chloride is added to the trialkyl phosphite or when the phosphite is added to the chloride.

The solvents used in the practice of this invention may be any one of the unsaturated aromatics having from 6 to 12 carbon atoms such as benzene, toluene, xylene, mesitylene and hexylbenzene; any of the saturated hydrocarbons and their isomers having 5 to 19 carbon atoms such as pentane, hexane, isooctane, dodecane, hexadecane and nonadecane; secondary and tertiary aliphatic alcohols having from 3 to 5 carbon atoms such as isopropanol, secondary butyl alcohol and tertiary amyl alcohol; ketones having from 3 to about 11 carbon atoms such as acetone, methylethyl ketone, methyl-n-propyl ketone and benzophenone; glycols having up to 6 carbon atoms such as ethylene glycol and hexamethylene glycol; the monoethers of the lower glycols such as ethylene glycol monomethyl ether up to ethylene glycol monoamyl ether; or the ethers such as ethyl ether and propyl ether.

The use of the above solvents facilitates the reaction but it will also proceed in good yield when conducted without a solvent.

The temperatures employed vary from about 20° C. to the reflux temperature of the highest boiling solvent, about 305° C. at reaction times of one-half hour to one week or more to give a good yield of product.

A preferred temperature range is from about 80° C. to about 200° C. since the reaction proceeds at a sufficiently rapid rate at this temperature range to give a good yield of product in a reasonable time with a minimum of undesirable side reactions.

Although excellent results are obtained throughout the temperature and time ranges stated above, preferred reaction times are from about 2 hours to about 12 hours. These reaction times give especially excellent results.

Pressure below atmospheric may be employed and is especially desirable when using a higher alkyl phosphite as a reactant. A by-product of the reaction between a trialkyl phosphite and a substituted halomethylphenol of Formula I is an alkyl halide which, if not removed, would react with the trialkyl phosphite thereby lowering the yield of the desired product. Reduced pressure is not particularly conducive of high yield when using lower trialkyl phosphites, since the lower alkyl halides are either gaseous at room temperature or at the temperature of the reaction and leave the reaction mixture by their own fugacity.

Stirring the reaction mixture facilitates the reaction but is not essential to the process, especially when refluxing the reaction mixture.

The compounds produced by the practice of this invention have the formula:

II
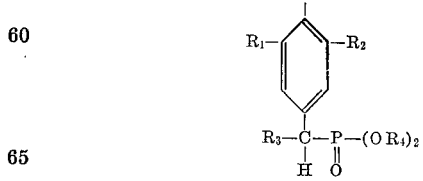

wherein $R_1$, $R_2$ and $R_3$ are as in Formula I and $R_4$ is an alkyl radical having from 1 to 12 carbon atoms. They are water insoluble, white to yellow, crystalline solids or, in the higher homologs, viscous liquids. They are non-corrosive and non-volatile, facilitating their incorporation into a wide range of organic material.

The following examples illustrate the practice of this invention according to the method outlined above.

EXAMPLE 1

In a reaction vessel equipped with a condenser, stirrer, vacuum source and means of heating, 10.0 parts of 3,5-di-tert-butyl-4-hydroxybenzyl chloride (obtained by reacting 2,6-di-tert-butylphenol with paraformaldehyde and hydrochloric acid) and 11.2 parts of triisopropyl phosphite in 60 parts of benzene, were refluxed for 3 hours. Vacuum was applied and the solvent removed. The residue was then allowed to crystallize for one hour. The solid was triturated with petroleum ether, cooled and filtered to yield 9.5 parts (67 percent) of crystalline diisopropyl (3,5-di-tert-butyl-4-hydroxybenzyl)phosphonate melting at 100–101° C. Recrystallization from petroleum ether afforded the product as a pure compound with a melting point of 104–105° C. Analytical: calculated for $C_{19}H_{33}PO_4$; C, 63.7 percent; H, 9.8 percent. Found: C, 63.9 percent; H, 10.1 percent.

Infrared absorption analysis shows tert-butyl compounds at 7.19 and 7.31 microns, a hydroxyl group at 2.69 microns, a phosphoryl group at 7.98 microns, a phosphorus-oxygen-aliphatic carbon group at 10.13 microns and teta-substitution at 11.25 microns.

EXAMPLE 2

In a reaction vessel equipped with a water condenser, stirrer, means of heating and vacuum source was placed 5.0 parts of 3,5-di-tert-butyl-4-hydroxybenzyl chloride (obtained as in Example 1), 3.3 parts of triethyl phosphite and 60 parts of benzene. The solution was refluxed for 3 hours, and then concentrated in vacuo. The residue was then triturated with 50 parts of petroleum ether. The solid which came out of the solution was filtered and washed with cooled petroleum ether to yield 4.2 parts (62 percent) of white crystalline diethyl (3,5-di-tert-butyl-4-hydroxybenzyl)phosphonate, which had a melting point of 119.5 to 120.5° C. Recrystallization from petroleum ether afforded the pure product with a melting point of 119 to 120° C.

Infrared absorption analysis shows tert-butyl groups at 7.17 and 7.31 microns, a hydroxyl group at 2.71 microns, a phosphoryl group at 7.98 microns, a phosphorus-oxygen-aliphatic carbon group at 9.70 microns and tetra-substitution at 11.30 microns.

EXAMPLE 3

A mixture of 125 parts of benzene and 25.5 parts of 3,5-di-tert-butyl-4-hydroxybenzyl chloride was placed in a reaction vessel equipped with a water condenser, stirrer and means of heating. An addition of 13.7 parts of trimethyl phosphite was made at room temperature. After refluxing for one and one-half hours, the mixture was allowed to stand at room temperature for about 15 hours. The solids which crystallized were collected by filtration and washed with isooctane to yield 27.2 parts (83 percent) of dimethyl (3,5-di-tert-butyl-4-hydroxybenzyl)phosphonate with a melting point of 157–159° C. The filtrate was reduced in volume and 1.5 parts of the compound melting at 155–157° C. was recovered for an overall yield of 87.5 percent.

Infrared absorption analysis shows tert-butyl groups at 7.16 and 7.33 microns, a hydroxyl group at 2.72 microns, a phosphoryl group at 7.96 microns, a phosphorus-oxygen-aliphatic carbon group at 9.65 microns and tetra-substitution at 11.27 microns.

EXAMPLE 4

In the reaction vessel of Example 3, 25.4 parts of 3,5-di-tert-butyl-4-hydroxybenzyl chloride in 100 parts of benzene was mixed with 33.4 parts of tri-n-hexyl phosphite. The mixture was subjected to reduced pressure and heated to 125–140° C. for 3.5 hours. After this time the residue was distilled, yielding 35 parts (75 percent) of di-n-hexyl(3,5-di-tert-butyl-4-hydroxybenzyl)phosphonate whose main cut boiled at 222–225° C. under a reduced pressure of 0.7 mm. Analytical: calculated for $C_{27}H_{49}PO_4$: P, 6.61 percent. Found: P, 6.91 percent.

Infrared absorption analysis shows tert-butyl groups at 7.18 and 7.32 microns, a hydroxyl group at 2.71 microns, a phosphoryl group at 7.98 microns, a phosphorus-oxygen-aliphatic carbon group at 9.93 microns and tetra-substitution at 11.22 microns.

EXAMPLE 5

Forty parts of tri-sec-butyl phosphite was added slowly, with stirring, to 38 parts of 3,5-di-tert-butyl-4-hydroxybenzyl chloride and dissolved in 300 parts of benzene in a reaction vessel equipped with a water condenser, stirrer, thermometer, and means for heating. When the temperature rose to 93° C., water aspirator vacuum was applied and the temperature was maintained at 76–102° C. for 1.5 hours. The distillate was collected in a cold trap. After standing for about 15 hours, the residue, 59.5 parts (100 percent yield) solidified. The solid was taken up in hot petroleum ether, cooled, precipitated and filtered. This yielded 37 parts (60 percent) of solid di-sec-butyl (3,5-di-tert-butyl-4-hydroxybenzyl)phosphonate melting at 78–80° C. A second recrystallization furnished material which was analyzed for phosphorus. Analytical: calculated for $C_{22}H_{39}PO_4$: P, 7.5 percent. Found: P, 7.4 percent.

Infrared absorption analysis shows tert-butyl groups at 7.17 and 7.33 microns, a hydroxyl group at 2.71 microns, a phosphoryl group at 8.01 microns, a phosphorus-oxygen-aliphatic carbon group at 10.20 microns and tetra-substitution at 11.28 microns.

EXAMPLE 6

In a reaction vessel equipped with a water condenser, stirrer, thermometer and means for heating are placed 250 parts of benzophenone. The temperature is raised to 60° C. and 47.2 parts of 2-methyl-6-n-dodecyl-4-(α-chloroethyl)phenol (obtained by reacting 2-methyl-6-n-dodecylphenol with acetaldehyde and hydrochloric acid) are added. An addition of 49.6 parts of tri-n-dodecyl phosphite is made at room temperature. The mixture is then heated at 305° C. for one-half hour. After cooling to 60° C. solids are collected by filtration and washed with n-octane to yield di-n-dodecyl(α-methyl-3-methyl-5-n-dodecyl-4-hydroxybenzyl)phosphonate.

EXAMPLE 7

In a reaction vessel equipped with a water condenser, stirrer, thermometer and means of heating is placed 8.72 parts of 2-n-decyl-6-amyl-4-(α-chloro-α'-p-hexylbenzyl) phenol (obtained by reacting 2-n-decyl-6-amylphenol with p-hexyl-benzaldehyde and hydrochloric acid) and 5.84 parts of triamyl phosphite. The reaction is then heated to 200° C. for 2 hours, cooled, and the residue triturated with 50 parts of petroleum ether to yield diamyl(α-p-hexylphenyl - 3 - n - decyl - 5 - amyl - 4 - hydroxybenzyl) phosphonate.

EXAMPLE 8

In a reaction vessel equipped with a water condenser, stirrer, thermometer, means for heating and a vacuum source, 4.7 parts of 2-methyl-6-tert-butyl-4-(α-chloroethyl)phenol (obtained by reacting 2-methyl-6-tert-butylphenol with acetaldehyde and hydrochloric acid) and 60.0 parts of tri-n-nonyl phosphite in 60 parts of dioxane are heated to 80° C. under reduced pressure for 12 hours, concentrated in vacuo, and the residue triturated with 50 parts of petroleum ether to yield di-n-nonyl(α-methyl-3-methyl-6-tert-butyl-4-hydroxybenzyl)phosphonate.

EXAMPLE 9

In a reaction vessel equipped with a stirrer is placed 10.0 parts of trimethyl phosphite and 8.0 parts of 3,5-diisopropyl-4-hydroxybenzyl chloride in 80 parts of isooctane. The reaction mixture is stirred at 20° C. for one week. The solids which form are collected by filtration and washed with isooctane to yield dimethyl(3,5-diisopropyl-4-hydroxybenzyl)phosphonate.

Examples of the compounds produced by the practice of this invention include: di-n-amyl (α-methyl-3-ethyl-5-isopropyl-4-hydroxybenzyl)phosphonate (produced by the reaction of α-methyl-3-ethyl-5-isopropyl-4-hydroxybenzyl chloride and tri-n-amyl phosphite); di-n-decyl(α-amyl 3 - n - octyl - 5 - n - dodecyl - 4 - hydroxybenzyl)-phosphonate (produced by the reaction of tri-n-decyl phosphite and α-amyl-3-n-octyl-5-n-dodecyl-4-hydroxybenzyl chloride); di-n-heptyl[α-ethyl - 3 - amyl - 5 - (2'-heptyl)-4-hydroxybenzyl]phosphonate (produced by the reaction of tri-n-heptyl phosphite and α-ethyl-3-amyl-5-(2'-heptyl)-4-hydroxybenzyl chloride); di-3'-dodecyl[α-(4' - undecyl) - 3 - n - propyl - 5 - tert - butyl - 4 - hydroxybenzyl]phosphonate (produced by the reaction of tri-3'-dodecyl phosphite and α-(4'-undecyl)-3-n-propyl-5-tert-butyl-4-hydroxybenzyl chloride); di-2'-octyl(α-n-propyl-3-n-nonyl - 4 - hydroxybenzyl)phosphonate (produced by the reaction of tri-2'-octyl phosphite and α-n-propyl-3-n-nonyl-4-hydroxybenzyl chloride); di-n-undecyl[α(3' - heptyl) - 3 - n - hexyl - 5 - n - butyl - 4 - hydroxybenzyl]phosphonate (produced by the reaction of tri-n-undecyl phosphite and α-(3'-heptyl)-3-n-hexyl-5-n-butyl-4-hydroxybenzyl chloride); di-n-butyl(α-p-hexylphenyl - 3,5 - diisopropyl - 4 - hydroxybenzyl)phosphonate (produced by the reaction of α-p-hexylphenyl-3,5-diisopropyl-4-hydroxybenzyl chloride and tri-n-butyl phosphite); di-n-nonyl(α-phenyl-3-n-undecyl-5-n-decyl-4-hydroxybenzyl)phosphonate (produced by the reaction of α-phenyl-3-n-undecyl-5-n-decyl-4-hydroxybenzyl chloride and tri-n-nonyl phosphite).

Although the compounds produced by the practice of this invention are described as those in which R₄ is an alkyl radical having from 1 to 12 carbon atoms, compounds in which these alkyl radicals are halogenated are also useful antioxidants and are susceptible of preparation by the present process.

In a preferred embodiment of this invention, the compounds to be produced consist of compounds of the above formula wherein R₃ is hydrogen. These compounds are preferred because of their ease of preparation from readily available starting materials. Among the compounds prepared by this preferred embodiment are: di - 3' - chloro - n - heptyl(3 - n - dodecyl - 5 - methyl - 4 - hydroxybenzyl)phosphonate (produced by the reaction of tri-3-'-chloro-n-heptyl phosphite and 3-n-dodecyl-5-methyl-4-hydroxybenzyl chloride); di-4'-dodecyl(3-n-propyl-5-n-octyl - 4 - hydroxybenzyl)phosphonate (produced by the reaction of 3-n-propyl-5-n-octyl-4-hydroxybenzyl chloride and tri-4'-dodecyl phosphite); diethyl(3-methyl-5-amyl-4-hydroxybenzyl)phosphonate (produced by the reaction of triethyl phosphite and 3-methyl-5-amyl-4-hydroxybenzyl chloride); di-2'-bromo-n-butyl(3-methyl-5-tert-butyl-4-hydroxybenzyl)phosphonate (produced by the reaction of tri-2'-bromo-n-butylphosphite and 3-methyl-5-tert-butyl-4-hydroxybenzyl chloride).

In another preferred embodiment of this invention, the compounds to be produced consist of compounds of the above formula wherein R₂ is an alpha-branched alkyl radical containing from 3 to 12 carbon atoms and R₄ is an alkyl radical having from 1 to 12 carbon atoms with no halogen substitution. These are particularly preferred because of their ease of preparation and their excellent antioxidant properties. Among the compounds prepared by this preferred embodiment are: diisopropyl(3-methyl - 5 - isopropyl - 4 - hydroxybenzyl)phosphonate (produced by the reaction of 3-methyl-5-isopropyl-4-hydroxybenzyl chloride and triisopropyl phosphite); di-amyl(3 - n - butyl - 5 - tert - butyl - 4 - hydroxybenzyl)-phosphonate (produced by the reaction of triamyl phosphite and 3-n-butyl-5-tert-butyl-4-hydroxybenzyl chloride); di-n-heptyl[3'-n-dodecyl)-4-hydroxybenzyl]phosphonate (produced by the reaction of 3-methyl-5-(3'-n-dodecyl)-4-hydroxybenzyl chloride and tri-n-heptyl phosphite); di-n-dodecyl (3-isopropyl-5-n-dodecyl-4-hydroxybenzyl)phosphonate (produced by the reaction of 3-isopropyl-5-n-dodecyl-4-hydroxybenzyl chloride and tri-n-phosphite).

The particularly preferred compounds produced by the practice of this invention consist of compounds of the above formula wherein R₃ is hydrogen, R₄ has no halogen substitution and R₁ and R₂ are both tert-butyl radicals. Among the compounds produced by this preferred embodiment are: dimethyl(3,5-di-tert-butyl - 4 - hydroxybenzyl)phosphonate (produced by the reaction of trimethyl phosphite and 3,5-di-tert-butyl-4-hydroxybenzyl chloride); diethyl(3,5-di-tert-butyl - 4 - hydroxybenzyl)-phosphonate (produced by the reaction of 3,5-di-tert-butyl-4-hydroxybenzyl chloride and triethyl phosphite); diisopropyl(3,5-di-tert-butyl - 4 - hydroxybenzyl)phosphonate (produced by the reaction of triisopropyl phosphite and 3,5-di-tert-butyl-4-hydroxybenzyl chloride); di-sec-butyl(3,5 - di - tert - butyl - 4 - hydroxybenzyl)phosphonate (produced by the reaction of 3,5-di-tert-butyl-4-hydroxybenzyl chloride and tri-sec-butyl phosphite); di-n-hexyl(3,5-di-tert-butyl - 4 - hydroxybenzyl)phosphonate (produced by the reaction of tri-n-hexyl phosphite and 3,5-di-tert-butyl-4-hydroxybenzyl chloride). These compounds are most superior antioxidants in lubricating oil and other organic media and are most readily and economically prepared.

The compounds produced by the practice of this invention are outstanding antioxidants. Therefore, a specific utility of this invention is an improved composition of matter which comprises organic material normally tending to undergo oxidative deterioration in the presence of air, oxygen or ozone containing an appropriate quantity—from 0.001 up to about 5 percent, and preferably from about 0.25 to about 2 percent—of a compound produced by this invention in Formula II above.

The compounds produced by the practice of this invention find important utility as antioxidants in a wide variety of oxygen-sensitive material. Thus, liquid hydrocarbon fuels such as gasoline, kerosene and fuel oil are found to possess increased storage stability by the use of an antioxidant produced by this invention. Likewise, liquid hydrocarbon fuels such as gasoline which contain organometallic additives such as tetraethyllead as well as other organometallic compounds which are used as fuel additives attain appreciably increased oxidative stability by the use of compounds produced by the practice of this invention. In addition, lubricant oils and functional fluids, both those derived from naturally occurring hydrocarbons and those synthetically prepared are greatly enhanced by compounds produced by the practice of this invention. The addition of small quantities of the compounds produced by this invention to such materials as turbine, hydraulic, transformer and other highly refined industrial oils, soaps and greases; plastics, synthetic polymers such as polyethylene and polypropylene; organometallic compositions where such fluids contain tetraethyllead and tetraethyllead antiknock mixtures as well as other organometallics; elastomers, including natural rubber, lubricating greases; crankcase lubricating oils; and the like, greatly increase resistance to deterioration in the presence of air, oxygen or ozone.

The compounds produced by the practice of this invention are also very useful in protecting petroleum wax—paraffin wax and microcrystalline wax—against oxidative deterioration. They also find use in the stabilization of edible fats and oils of animal and vegetable orgin which tend to become rancid, especially during long periods of storage because of oxidative deterioration. Typical representatives of these edible fats and oils are linseed oil, cod liver oil, castor oil, soy bean oil, rape seed oil, coconut oil, olive oil, palm oil, corn, seseme oil, peanut oil, babassu oil, butter fat, lard, beef tallow, and the like.

The compounds produced by the practice of this invention are also useful in preventing oxidative deterioration in lubricating oil compositions. Thus, a specific utility of these compounds is a lubricating oil normally susceptible to oxidative deterioration in a small antioxidant, up to 5 percent, of a compound as defined above.

To prepare such superior lubricants an appropriate quantity—from about 0.001 to about 5 percent and preferably from about 0.25 to about 2 percent—of a compound produced by the practice of this invention is blended with the base oil to be protected. Suitable base oils include mineral oils and also synthetic diester oils such as sebacates, adipates, etc., which find particular use as aircraft instrument oils, hydraulic and damping fluids and precision bearing lubricants. All of these base oils are normally susceptible to oxidative deterioration, especially at elevated temperatures. The finished lubricants have much greater oxidation stability and many other improved performance characteristics as compared with the corresponding base oils.

To illustrate the useful properties of the compounds produced by the practice of this invention, recourse is had to the Polyveriform Oxidation Stability Test as described in the paper entitled "Factors Causing Lubricating Oil Deterioration in Engines" [Ind. and Eng. Chem., Anal. Ed. 17, 302 (1945)]. See also "A Bearing Corrosion Test for Lublicating Oils and its Correlation with Engine Performance" [Al. Chem., 21, 737 (1949)]. This test effectively evaluates the performance of lubricating oil antioxidants. The test equipment procedure employed and correlations of the results with engine performance are discussed in the first paper cited above. By employing various compounds of this invention in oxygen-sensitive lubricating oil, effective inhibition of oxidation deterioration is achieved.

Comparative tests were conducted using the method and apparatus essentially as described in the paper mentioned above entitled "Factors Causing Lublicating Oil Deterioration in Engines." One minor modification was that the steel sleeve and copper test piece described in this publication were omitted from the apparatus. In these tests an initially additive-free 95 V.I. solvent-refined SAE–10 crankcase oil was used. The principal test conditions consisted of passing 70 liters of air per hour through the test oil for a total period of 20 hours while maintaining the oil at a temperature of 300° F. Oxidative deterioration of the oil was further promoted by employing as oxidation catalysts 0.05 percent by weight of ferric oxide (as ferric 2-ethyl hexoate) and 0.10 percent by weight of lead bromide, both of these amounts being based upon the weight of the oil employed.

Superior lubricating oils were prepared by blending compounds produced by the practice of this invention with the oil described above. These compositions were compared in the Polyveriform Test with a sample of the oil not containing the antioxidant.

As can be seen from the results listed in Table I, oils containing a compound produced by this invention give much superior results than base oils containing no additive.

*Table I*

| Additive | Additive concentration weight percent | Acid number | Viscosity increase SUS at 100° F. |
|---|---|---|---|
| None | 0 | 7.8 | 126 |
| Dimethyl(3,5-di-tert-butyl-4-hydroxybenzyl)phosphonate | 1.0 | 1.9 | 13 |
| Diethyl(3,5-di-tert-butyl-4-hydroxybenzyl)phosphonate | 1.15 | 1.9 | 19 |
| Di-n-hexyl(3,5-di-tert-butyl-4-hydroxybenzyl)phosphonate | 2.175 | 2.5 | 23 |
| Diisopropyl(3,5-di-tert-butyl-4-hydroxybenzyl)phosphonate | 1.0 | 3.5 | 39 |

We claim:
1. A process for preparing compounds having the formula:

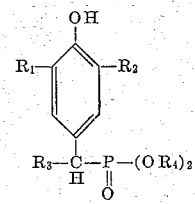

wherein $R_1$ is an alkyl radical having from 1 to 12 carbon atoms, $R_2$ is an alkyl radical having from 3 to 12 carbon atoms, $R_3$ is selected from the group consisting of hydrogen, alkyl radicals having from 1 to 12 carbon atoms and mononuclear aryl radicals having from 6 to 12 carbon atoms and $R_4$ is an alkyl radical having from 1 to 12 carbon atoms, said process comprising reacting a compound having the formula:

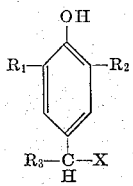

wherein $R_1$ is an alkyl radical having from 1 to 12 carbon atoms, $R_2$ is an alkyl radical having from 3 to 12 carbon atoms, $R_3$ is selected from the group consisting of hydrogen, alkyl radicals having from 1 to 12 carbon atoms and mononuclear aryl radicals having from 6 to 12 carbon atoms and X is a halogen, with a trialkyl phosphite wherein the alkyl groups each have from 1 to 12 carbon atoms.

2. The process of claim 1 wherein $R_3$ is hydrogen and X is chlorine.
3. The process of claim 2 wherein $R_1$ and $R_2$ are tertiary butyl groups.
4. The process of claim 1 wherein said alkyl groups in said trialkyl phosphite each have from 1 to 6 carbon atoms.
5. The process of claim 2 wherein said alkyl groups in said trialkyl phosphite each have from 1 to 6 carbon atoms.
6. The process of claim 3 wherein said alkyl groups in said trialkyl phosphite each have from 1 to 6 carbon atoms.
7. The process of claim 6 wherein the trialkyl phosphite is trimethyl phosphite.
8. The process of claim 6 wherein the trialkyl phosphite is triethyl phosphite.
9. The process of claim 6 wherein the trialkyl phosphite is triisopropyl phosphite.
10. The process of claim 6 wherein the trialkyl phosphite is tri-sec-butyl phosphite.
11. The process of claim 6 wherein the trialkyl phosphite is tri-n-hexyl phosphite.

No references cited.